United States Patent
Balasubramanian et al.

(10) Patent No.: US 8,724,537 B2
(45) Date of Patent: May 13, 2014

(54) METHOD AND APPARATUS FOR ENHANCING CONTROL CHANNEL TRANSMISSION

(75) Inventors: Srinivasan Balasubramanian, San Diego, CA (US); Thomas Klingenbrunn, San Diego, CA (US); Zhengwei Liu, San Diego, CA (US); Jack S. Shauh, San Diego, CA (US); Jun Wang, La Jolla, CA (US); Xiaoxia Zhang, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/302,129

(22) Filed: Nov. 22, 2011

(65) Prior Publication Data

US 2013/0128768 A1      May 23, 2013

(51) Int. Cl.
    *H04H 20/71*      (2008.01)

(52) U.S. Cl.
    USPC ................................................. 370/312

(58) Field of Classification Search
    CPC combination set(s) only.
    See application file for complete search history.

(56) References Cited

U.S. PATENT DOCUMENTS

| | | | |
|---|---|---|---|
| 7,729,309 B2 | 6/2010 | Yoshida et al. | |
| 8,204,010 B2 * | 6/2012 | Suzuki et al. | 370/329 |
| 2009/0207771 A1 | 8/2009 | Lindskog et al. | |
| 2010/0128646 A1 | 5/2010 | Gao | |
| 2010/0278093 A1 | 11/2010 | Wang et al. | |
| 2010/0323707 A1 | 12/2010 | Huschke et al. | |
| 2011/0026645 A1 | 2/2011 | Luo et al. | |
| 2012/0134311 A1 * | 5/2012 | Zhai et al. | 370/312 |

FOREIGN PATENT DOCUMENTS

WO      02080607 A1      10/2002

OTHER PUBLICATIONS

NEC Group: "Downlink Control Channels: CCE Aggregation and Blind Detection", TSG-RAN WG1 #5LBIS, R1-080232, Jan. 1, 2008, pp. 1-4, XP008132212.
Partial International Search Report and Written Opinion—PCT/US2012/063691—ISA/EPO—Feb. 7, 2013.
ZTE: "MCS configuration method", R2-093894, 3RD Generation Partnership Project (3GPP), Mobile Competence Centre; 650, Route Des Lucioles; F-06921 Sophia-Antipolis Cedex; France, No. Los Angeles, USA; Jun. 23, 2009, XP050352094.
CATT; HARQ combination of MCCW , 3GPP Draft; R2-093699 HARQ Combination of MCCH. 3RD Generation Partnership Project (3GPP). Mobile Competence Centre; 650, Route Des Lucioles ; F-06921 Sophia-Antipolis Cedex ; France, no. Los Angeles. USA; Jun. 23, 2009. XP050351936, [retrieved on Jun. 23, 2009].
International Search Report and Written Opinion—PCT/US2012/063691—ISA/EPO—Apr. 8, 2013.

* cited by examiner

*Primary Examiner* — Clemence Han
(74) *Attorney, Agent, or Firm* — Arent Fox LLP

(57) ABSTRACT

Methods and apparatuses are provided that include enhancing decoding of multicast broadcast control communications, which can be of a relatively large size. A configuration message related to a broadcast channel structure can be received in multiple instances and/or segmented data units. A receiver can combine multiple instances and/or accumulate segmented data units to obtain and/or decode a control channel over which the configuration message is communicated. Communicating segmented data units of the configuration message can allow a broadcast station to utilize a lower data rate, more reliable modulation and coding scheme to encode the configuration message.

21 Claims, 12 Drawing Sheets

METHOD AND APPARATUS FOR ENHANCING CONTROL CHANNEL TRANSMISSION

BACKGROUND

1. Field

The following description relates generally to wireless network communications, and more particularly to improving communication of a control channel in broadcast services.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

Evolved multicast broadcast multimedia service (eM-BMS) can also be supported such that base stations or other devices can broadcast multimedia data over multimedia broadcast over single frequency network (MBSFN) subframes or similar subframes. Devices can receive and consume the data based at least in part on parameters regarding structure and occurrence of the MBSFN subframes. In one specific example, a base station can transmit a configuration message (e.g., MBSFNAreaConfiguration message) over a control channel that specifies allocated resources and periods for transmitting channels (e.g., physical multicast channels (PMCH)), corresponding logical channel identifiers for the channels, multicast channel (MCH) scheduling period (MSP) over which a MCH scheduling information (MSI) media access control (MAC) control element is transmitted, etc. Such configuration messages can comprise information regarding a large number of channels, and can thus be relatively large. Thus, a modulation and coding scheme of a high data rate can be used to communicate the configuration messages, which can degrade transmission robustness and reliability.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with enhancing control channel communications in broadcast services. In one example, a configuration message can be transmitted multiple times over a multicast control channel to improve reliability of receiving the configuration message. In another example, multiple instances of one or more configuration messages, as received over the control channel in one or more time periods, can be combined to attempt decoding of a received configuration message. Moreover, in an example, the configuration message can be segmented into multiple signals, which are combined upon receipt to decode the configuration message.

According to an example, a method for decoding multicast broadcast control data in a wireless network is provided including receiving a plurality of media access control (MAC) protocol data units (PDU) from a broadcast station and determining the plurality of MAC PDUs include a control channel based in part on a modulation and coding scheme (MCS) utilized to successfully decode the plurality of MAC PDUs. The method further includes acquiring the control channel from the plurality of MAC PDUs.

In another aspect, an apparatus for decoding multicast broadcast control data in a wireless network is provided. The apparatus includes means for receiving a plurality of MAC PDUs from a broadcast station. The apparatus further includes means for means for determining the plurality of MAC PDUs relate to a control channel based in part on a MCS utilized to successfully decode the plurality of MAC PDUs and means for acquiring the control channel from the plurality of MAC PDUs.

In yet another aspect, an apparatus for wireless communications is provided that includes at least one processor configured to receive a plurality of MAC PDUs from a broadcast station. The at least one processor can be further configured to determine the plurality of MAC PDUs relate to a control channel based in part on a MCS utilized to successfully decode the plurality of MAC PDUs and acquire the control channel from the plurality of MAC PDUs. The apparatus also includes a memory coupled to the at least one processor.

Still, in another aspect, a computer-program product for decoding multicast broadcast control data in a wireless network is provided including a computer-readable medium having code for causing at least one computer to receive a plurality of MAC PDUs from a broadcast station. The computer-readable medium further includes code for causing the at least one computer to determine the plurality of MAC PDUs relate to a control channel based in part on a MCS utilized to successfully decode the plurality of MAC PDUs and code for causing the at least one computer to acquire the control channel from the plurality of MAC PDUs.

Moreover, in an aspect, an apparatus for decoding multicast broadcast control data in a wireless network is provided that includes a receiving component for receiving a plurality of MAC PDUs from a broadcast station and a MCS decoding component for determining the plurality of MAC PDUs relate to a control channel based in part on a MCS utilized to successfully decode the plurality of MAC PDUs. The apparatus further includes a control channel acquiring component for acquiring the control channel from the plurality of MAC PDUs.

According to another example, a method for decoding multicast broadcast control data in a wireless network is provided including receiving a first control data signal instance in a first multicast control channel (MCCH) repetition period of a MCCH modification period and receiving a second control data signal instance in a second MCCH repetition of the MCCH modification period. The method further includes combining the first control data signal instance and the second control data signal instance to generate a combined signal and decoding the combined signal to acquire the MCCH.

In another aspect, an apparatus for decoding multicast broadcast control data in a wireless network is provided. The apparatus includes means for receiving a first control data signal instance in a first MCCH repetition period and receiving a second control data signal instance in a second MCCH repetition period of a MCCH modification period. The apparatus further includes means for combining the first control data signal instance and the second control data signal instance to generate a combined signal and means for decoding the combined signal to acquire the MCCH.

In yet another aspect, an apparatus for wireless communications is provided that includes at least one processor configured to receive a first control data signal instance in a first MCCH repetition period of a MCCH modification period and receive a second control data signal instance in a second MCCH repetition period of the MCCH modification period. The at least one processor can be further configured to combine the first control data signal instance and the second control data signal instance to generate a combined signal and decode the combined signal to acquire the MCCH. The apparatus also includes a memory coupled to the at least one processor.

Still, in another aspect, a computer-program product for receiving multicast broadcast data in a wireless network is provided including a computer-readable medium having code for causing at least one computer to receive a first control data signal instance in a first MCCH repetition period of a MCCH modification period and code for causing the at least one computer to receive a second control data signal instance in a second MCCH repetition period of the MCCH modification period. The computer-readable medium further includes code for causing the at least one computer to combine the first control data signal instance and the second control data signal instance to generate a combined signal and code for causing the at least one computer to decode the combined signal to acquire the MCCH.

Moreover, in an aspect, an apparatus for decoding multicast broadcast control data in a wireless network is provided that includes a receiving component for receiving a first control data signal instance in a first MCCH repetition period and receiving a second control data signal instance in a second MCCH repetition period of a MCCH modification period. The apparatus further includes a channel instance combining component for combining the first control data signal instance and the second control data signal instance to generate a combined signal and a modulation and coding scheme decoding component for decoding the combined signal to acquire the MCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
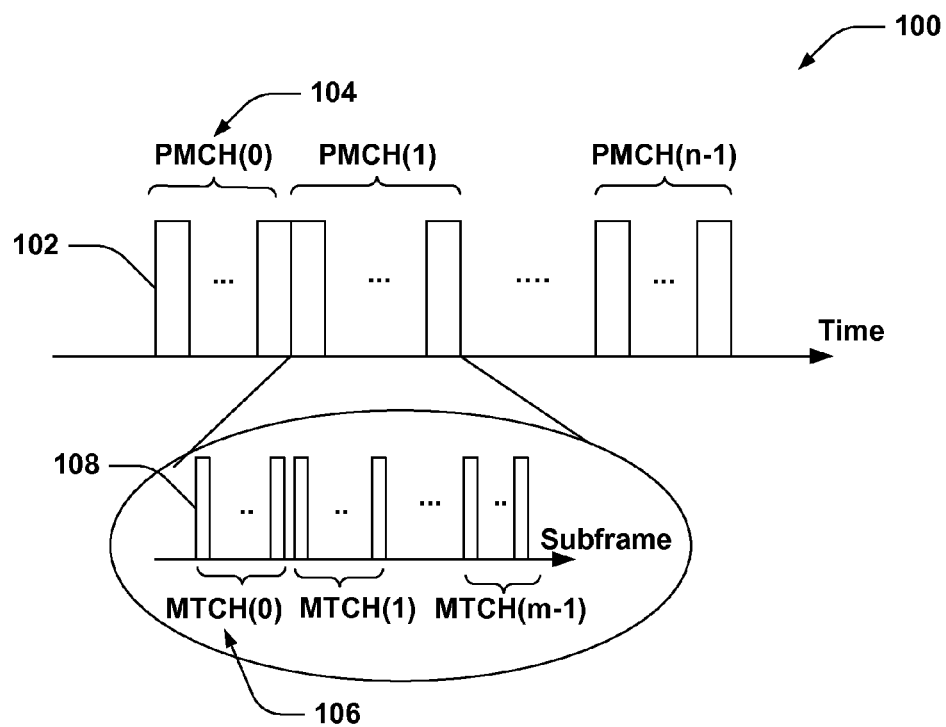
FIG. 1 is a block diagram of an aspect of an example frame configuration for multicast broadcast data.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to improving control channel communications in broadcast services. For example, configuration message transmissions can be relatively large, and can use high data rate modulation and coding (MCS) schemes for transmission, which can degrade reliability of receiving such messages. Thus, in one example, the configuration message can be transmitted in multiple control data signal instances in a repetition period. In another example, a device receiving the configuration message can attempt to decode the configuration message from the multiple control data signal instances (e.g., in combination with one or more previously received instances) to improve probability of successful decoding. In yet another example, the configuration message can be segmented into multiple signals for transmission, which can allow a lower data rate, more reliable MCS to be used for each of the multiple signals. A device receiving the multiple signals can determine when the configuration message or a related control channel is received in full before decoding thereof.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example multicast resource configuration 100 for multicast broadcast communication. For example, multicast broadcast services can be provided over a time division multiplexing (TDM), orthogonal frequency division multiplexing (OFDM) or similar system for wireless communications. For example, multicast resource configuration 100 can include multiple communication subframes, such as subframe 102 over which broadcast data can be communicated. In one example, subframe 102 can include one or more OFDM symbols that additionally include a number of frequency subcarriers that can be assigned to various communications. In this example, multicast resource configuration 100 can be a number of frames or subframes reserved for communicating multicast broadcast data.

Frame 100 can include multiple (e.g., n, where n is an integer) physical multicast channels (PMCH) 104 over which broadcast data can be communicated in one or more frames. Each PMCH 104 can include a number of subframes 102. Each PMCH 104 can also include a number (e.g., m, where m is an integer) of logical multicast traffic channels (MTCH) 106 within the subframes 102 of the PMCH. Moreover, for example, a given PMCH can be defined over one or more and/or a portion of a subframe, and the MTCHs 106 can correspond to the one or more and/or a portion of the given subframe. MTCHs 106 can also include a number of OFDM subframes 108, which can be the same as subframes 102 and/or portions thereof.

In a specific example, a base station or other broadcasting entity can schedule PMCHs 104 for carrying certain multicast broadcast data, and can broadcast configuration information. For example, in evolved multicast broadcast multimedia service (eMBMS), a base station can broadcast a multimedia broadcast over single frequency network (MBSFN) configuration message (e.g., MBSFNAreaConfiguration message), or other configuration message, over a multicast control channel (MCCH) that indicates resources allocated for transmitting PMCHs 104 in an MBSFN area, a temporary mobile group identity (TMGI) and session identifier of the MTCHs 106, a multicast channel (MCH) scheduling period (MSP) over which a MCH scheduling information (MSI) MAC control element can be transmitted, etc. The MSI MAC control element schedules MTCHs 106 and/or can indicate subframe resource information for the MTCHs 106.

Assuming that the MBSFN configuration is received, the PMCH transmission structure can be obtained as well as the MSP during which each PMCH communicates a corresponding MSI MAC control element that indicates an MTCH 106 structure within the PMCH 104. The MBSFN configuration, however, can be relatively large. For example, an MBSFNAreaConfiguration message can have a length of at least 1740 bytes (e.g., 29 MTCHs per PMCH×15 PMCHs×a 4 byte TMGI per MTCH=1740 bytes). A high data rate MCS, such as M-quadrature amplitude modulation (M-QAM), can be used to transmit this message, as described, which can degrade transmission robustness and/or a likelihood that the message is successful received. Without this message, information for decoding broadcast communications may not be available. Thus, enhancements for communicating such configuration messages are described herein.

Figure 2:
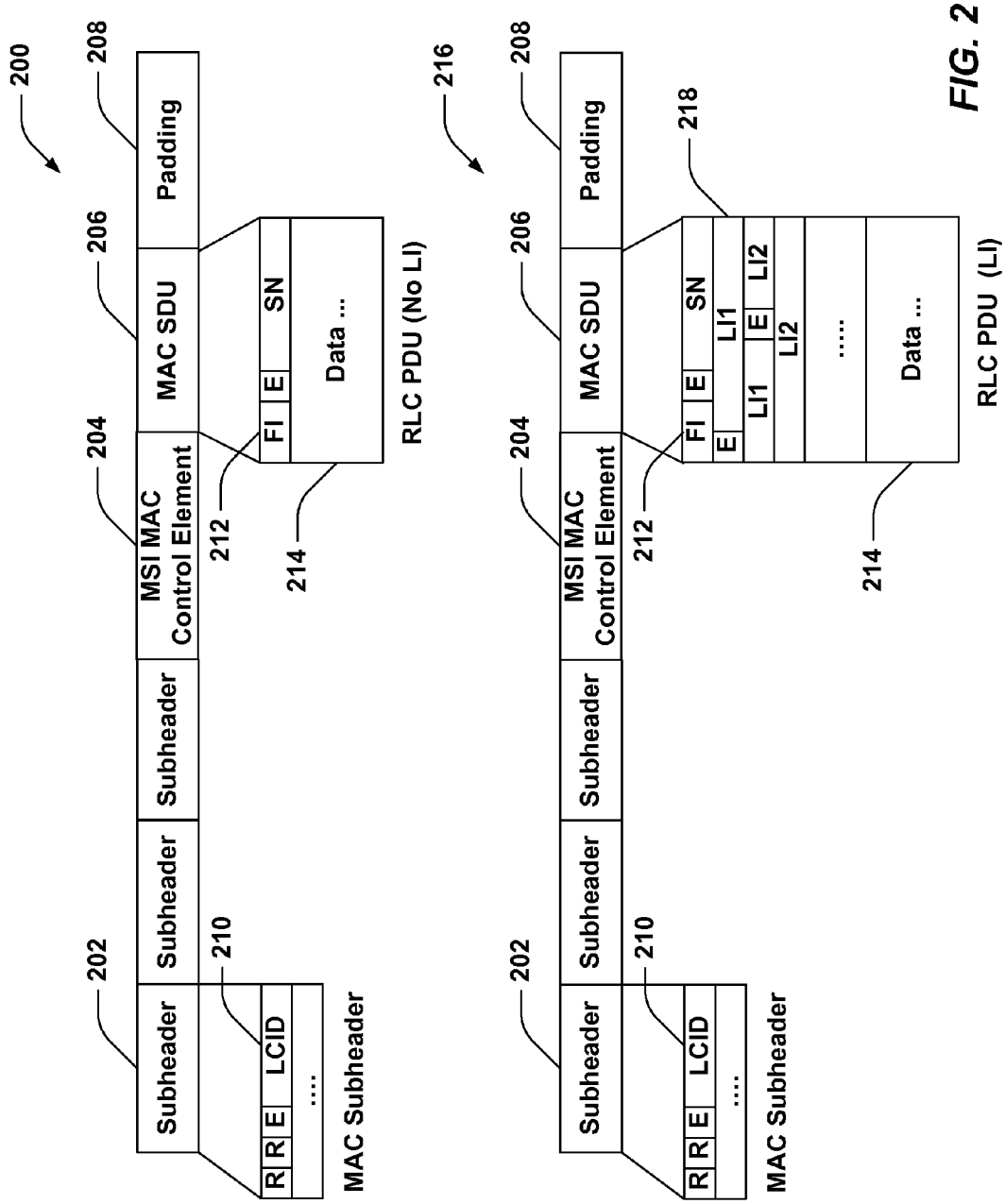
FIG. 2 is a block diagram of an aspect of example protocol data units (PDU) for multicast broadcast data.

FIG. 2 illustrates example MAC PDUs 200 and 216 for communicating multicast broadcast data. MAC PDU 200 can include a plurality of subheaders 202, a MSI MAC control element 204, a MAC SDU 206, and/or padding bits 208. At least one of the subheaders 202 can be a MAC subheader that includes a logical channel identifier (LCID) 210 related to data in the MAC SDU 206 (e.g., the LCID 210 can identify a logical channel corresponding to the data). For example, the LCID 210 can indicate whether the MAC SDU 206 includes a portion of the MCCH, MTCH, MSI MAC control element, or other data. In a specific example, LCID 210 of 0 can indicate MCCH; 1-28 can indicate MTCHs (or 0-28 where no MCCH is present); 29 can indicate MSI MAC control element 204; 30 can be reserved; and 31 can indicate padding 208.

The MAC SDU 206 can include a radio link control (RLC) layer PDU with no length indicator (LI). MAC SDU 206 can also include framing information 212 along with the data 214 where the framing information 212 can include parameters regarding whether certain bits in data 214 correspond to first or last bits in the RLC PDU. In one example, the framing information can be two bits defined as: 00—first byte of the data 214 field corresponds to the first byte of an RLC SDU, and last byte of the data 214 field corresponds to the last byte of a RLC SDU; 01—first byte of the data 214 field corresponds to the first byte of an RLC SDU, and last byte of the data 214 field does not correspond to the last byte of a RLC SDU; 10—first byte of the data 214 field does not correspond to the first byte of an RLC SDU, and last byte of the data 214 field corresponds to the last byte of a RLC SDU; and 11—first byte of the data 214 field does not correspond to the first byte of an RLC SDU, and last byte of the data 214 field does not correspond to the last byte of a RLC SDU. In some examples, the framing information can be used to determine whether the MAC SDU 206 includes a last MAC SDU for a given LCID, as described further herein. MAC PDU 216 is similar to MAC PDU 200 other than that the RLC PDU includes LIs 218, e.g., LI1, LI2, etc.

Figure 3:
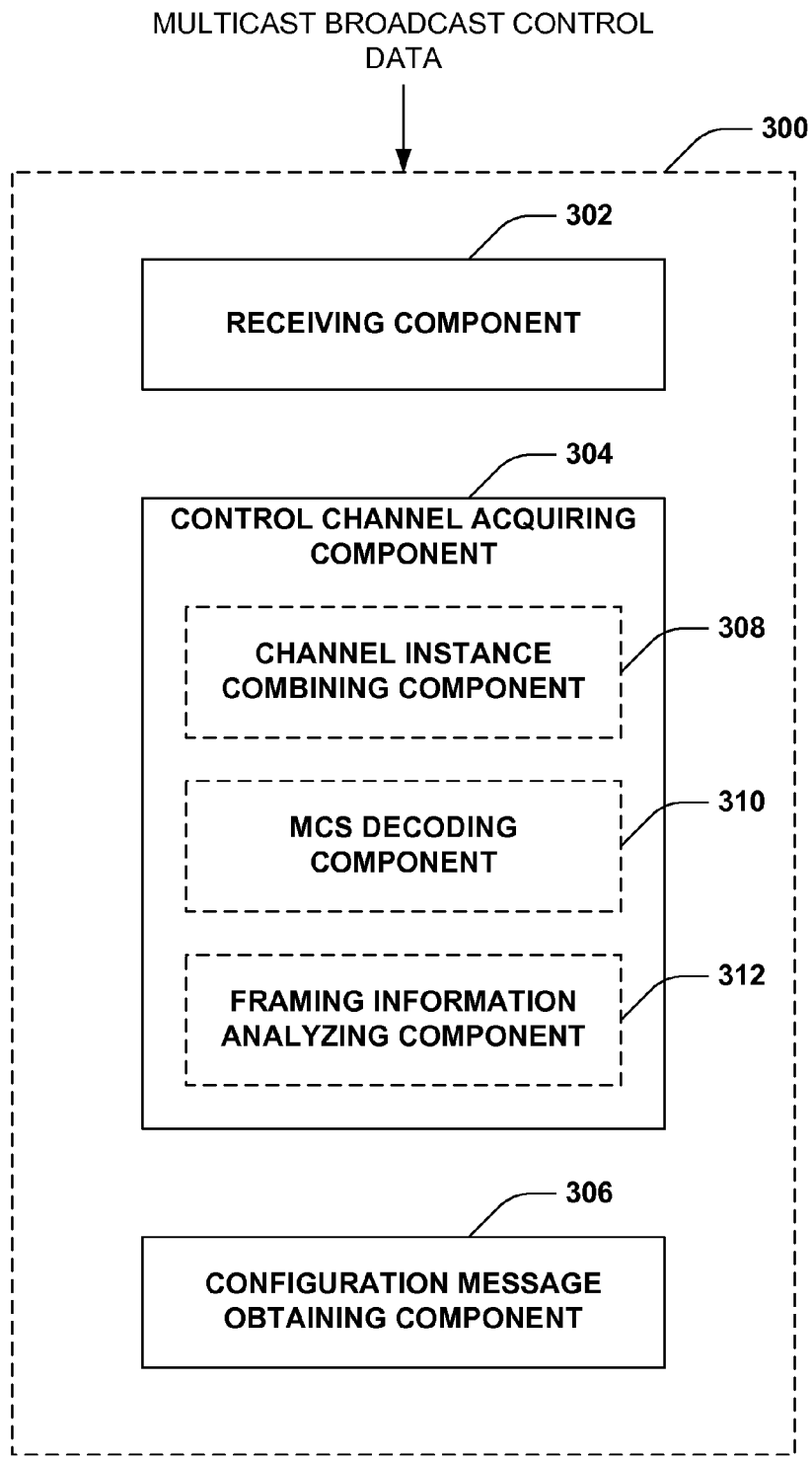
FIG. 3 is a block diagram of an example apparatus for decoding multicast broadcast control data.

FIG. 3 illustrates an example apparatus 300 for processing multicast broadcast data received from one or more sources. Apparatus 300 can be a UE, modem (or other tethered device), femto node (or component thereof, such as a network listening module), home Node B or home eNode B (H(e)NB), a pico node, micro node, relay station, mobile base station, macro node, a portion thereof, and/or substantially any node equipped to receive broadcast signals in a wireless network.

Apparatus 300 can include a receiving component 302 for receiving multicast broadcast control data in one or more signals, a control channel acquiring component 304 for acquiring a control channel communicated in the one or more signals, and a configuration message obtaining component 306 for receiving a configuration message from the control channel. Control channel acquiring component 304 can optionally include a channel instance combining component 308 for utilizing repetitive control signals to attempt to decode a control channel, a MCS decoding component 310 for attempting to decode control signals according to one or more MCSs, and/or a framing information analyzing component 312 for determining whether a signal includes a control channel based on framing information.

According to an example, receiving component 302 can receive one or more multicast broadcast control data signals from a broadcast station (e.g., a base station, relay node, etc.). Though described herein as generally received from a broadcast station, it is to be appreciated that receiving component 302 can receive the one or more multicast broadcast control data signals from a plurality of broadcast stations in MBSFN, where the plurality of broadcast stations transmit substantially the same signal that can differ at the receiving component 302 due to propagation delay, interference over a channel, and/or the like.

In one example, the broadcast station can transmit multiple instances of the same control data signal that include information for acquiring a control channel within a period of time. In this example, control channel acquiring component 304 can provide the multiple instances to the channel instance combining component 308 to generate a combined control data signal, and can utilize the MCS decoding component 310 to decode the control channel from the combined control data signal. For example, the MCS decoding component 310 can utilize an MCS related to a control channel to decode the control channel from the combined control data signal, as described further herein. For example, the MCS can include binary phase-shift keying (BPSK), quadrature phase-shift keying (QPSK), M-phase-shift keying (M-PSK), M-QAM, and/or the like. Upon decoding the control channel, configuration message obtaining component 306 can extract a configuration message from the control channel for determining a channel structure of related multicast broadcast data.

In one example, the broadcast station can transmit multiple instances of the control data signal in a time period related to corresponding broadcast data. The number of instances, in an example, can be signaled in a system information block (SIB) or other broadcast message. For example, in LTE, a MCCH modification period related to an MCCH can include one or more MCCH repetition periods, during which a control data signal including control channel information can be transmitted. Thus, for example, the broadcast station can transmit a plurality of control data signal instances related to an MCCH, which can each include an MBSFNAreaConfiguration message, at the beginning of a given MCCH repetition period. In this example, receiving component 302 can receive a plurality of the control data signal instances in a given MCCH repetition period. Channel instance combining component 308 can combine the control data signal instances into a single signal, and MCS decoding component 310 can attempt to decode the single signal to acquire the MCCH, and corresponding MBSFNAreaConfiguration message.

In another example, receiving component 302 can receive a first control data signal instance, and MCS decoding component 310 can attempt to decode the first control data signal instance to acquire the MCCH. If decoding fails, for example, receiving component 302 can receive a second control data signal instance, and MCS decoding component 310 can attempt to decode the second control data signal instance to acquire the MCCH. For example, the second control data signal instance can be received in a second MCCH repetition period in the same MCCH modification period as the first control data signal instance. If decoding of the second control data signal instance fails, channel instance combining component 308 can combine the signals of the first and second control data signal instances, and MCS decoding component 310 can attempt to decode the combined signal to acquire the MCCH. In another example, channel instance combining component 308 can combine signals of the first and second control data signal instances without MCS decoding component 310 attempting to decode the second control data signal instance alone. Moreover, where a third control data signal instance is received (e.g., in a third MCCH repetition period of the MCCH modification period), MCS decoding component 310 can attempt to decode the third control data signal instance alone, in combination with the second control data signal instance, in combination with the first control data signal instance, or in combination with the first and second control data signal instances, as combined by channel instance combining component 308, for example, to acquire the MCCH. It is to be appreciated that the MCS decoding component 310 can attempt to decode additional control data signal instances as well for combining with other control data signal instances to acquire the MCCH.

In one example, the MCS decoding component 310 can utilize control data signal instances received by receiving component 302 across time periods to attempt to decode the control channel. For example, receiving component 302 can utilize a control data signal instance received in a plurality of MCCH repetition periods, MCCH modification periods, and/or the like. Thus, for example, where the MCS decoding component 310 is unable to decode a control data signal instance received by receiving component 302, channel instance combining component 308 can combine the control data signal instance with one or more previously received control data signal instances (e.g., in a previous MCCH repetition period, MCCH modification period, or other time period), and attempt to decode the MCCH from the combined signals. In this example, the control channel acquiring component 304 can store the previously received bits of one or more control data signal instances in the decoder buffer for channel instance combining component 308 to combine one or more previous copies for attempted decoding of the MCCH. In any case, once the combined control data signal instances are decoded, the control channel acquiring component 304 can acquire the MCCH from the decoding.

In another example, a broadcast station can transmit the control channel in multiple signals or related data units, as described further herein. In one example, the broadcast station can utilize framing information to indicate a first and/or last data unit carrying the control channel, and thus framing information analyzing component 312 can use the framing information to determine whether a data unit received by receiving component 302 is a last data unit. When the last data unit is encountered, the MCS decoding component 310 can attempt to decode the control channel from the received data units. In another example, the broadcast station can utilize a different MCS for encoding the control channel than for data channels. In this example, MCS decoding component 310 can attempt to decode data units received by receiving component 302 using the MCS for control channels. Once decoding fails, control channel acquiring component 304 can acquire the control channel from the corresponding data units.

In a specific example, receiving component 302 can receive one or more MAC PDUs in one or more signals from a broadcast station, and control channel acquiring component 304 can attempt to decode the signals using an MCS for MCCH (e.g., signaling-MCS in LTE), which can indicate, upon successful decoding, that the signals relate to or otherwise include a MCCH. In one example, framing information analyzing component 312 can obtain framing information from a MAC SDU related to the MAC PDU to determine whether the MAC SDU includes an end of the MCCH (e.g., where the framing information is 00 or 10 in the example of FIG. 2). If not, receiving component 302 can receive a subsequent signal, and/or MCS decoding component 310 can decode a MAC PDU in a next subframe until the end of the MCCH is determined from the framing information. Once the end of the MCCH is determined, the control channel acquiring component 304 can acquire the control channel by accumulating and combining SDUs for which the PDUs are successfully decoded by MCS decoding component 310 using the MCS for MCCH.

In another example, MCS decoding component 310 can continue decoding signals or related MAC PDUs until decoding the MCCH using the MCS for the MCCH results in an unsuccessful decoding, which can indicate the related MAC PDU does not correspond to the MCCH. For example, the MAC PDU can be a different channel, such as a MTCH, MSI MAC control element, and/or the like encoded using a different MCS, such as data-MCS. In this example, control channel acquiring component 304 can utilize the successfully decoded PDUs to acquire the MCCH. In any case, once the control channel is decoded, configuration message obtaining component 306 can extract the configuration message, such as an MBSFNAreaConfiguration message, to determine a subsequent PMCH channel structure.

Figure 4:
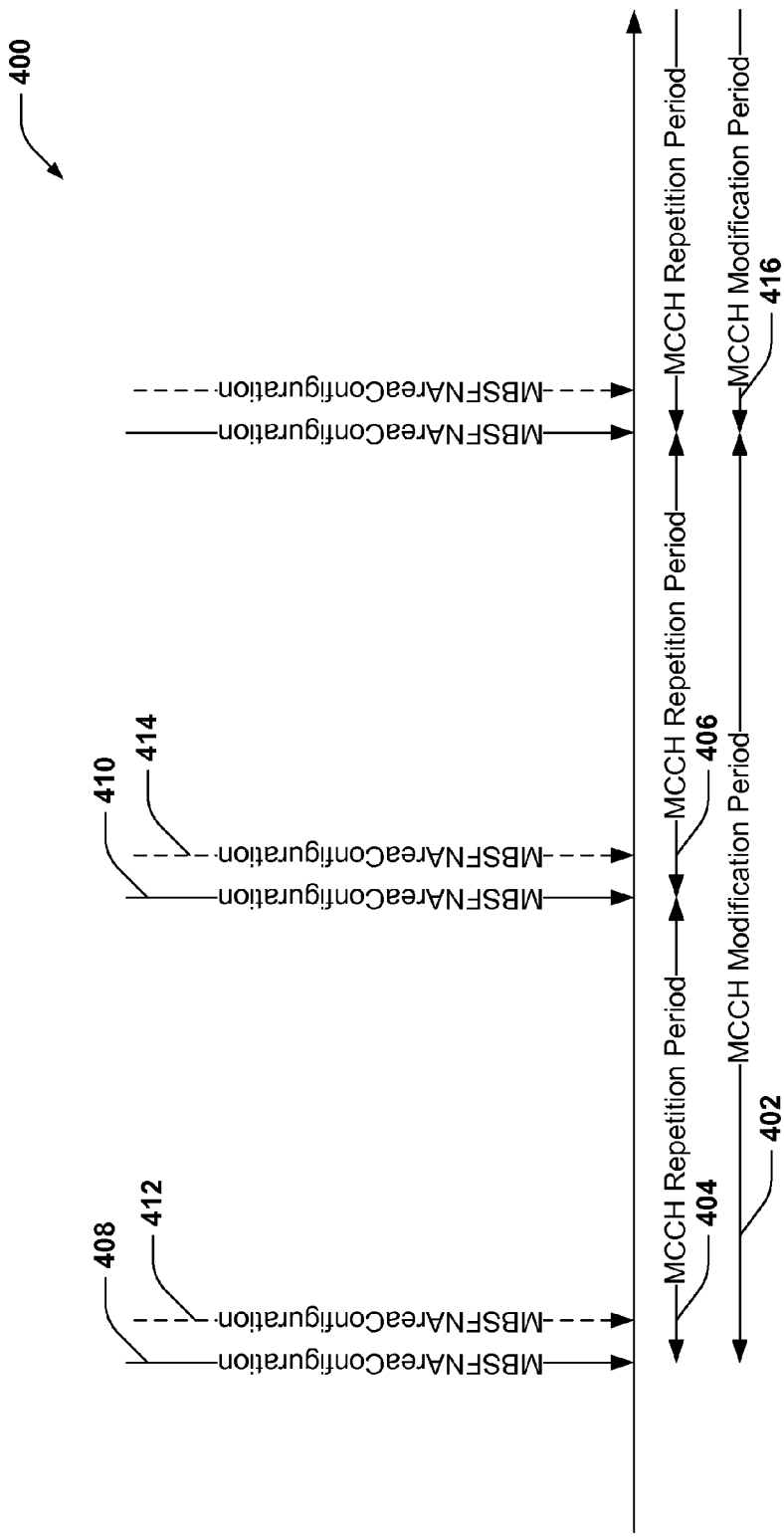
FIG. 4 is a block diagram of an example communication timeline for communicating a configuration message over a control channel.

FIG. 4 depicts an example timeline 400 for communicating configuration messages in multicast broadcast services. Timeline 400 includes multiple MCCH modification periods 402 and 416 during which MCCH configuration information can be communicated. In addition, a given MCCH modification period 402 can include a plurality of MCCH repetition periods 404 and 406 during which the MCCH and related configuration information can be repeatedly transmitted to improve successful receipt of the information. For example, in a given MCCH repetition period 404 or 406 a broadcast station can transmit a MBSFNAreaConfiguration message 408 or 410 over resources of the MCCH. As described, such messages can be large, and the broadcast station can attempt to improve receipt by transmitting multiple control data signal instances corresponding to the MCCH that includes the MBSFNAreaConfiguration message 412 or 414 in the given MCCH repetition period 404 or 406.

A receiver of the messages 408 and 412, for example, can attempt to obtain the MBSFNAreaConfiguration message by combining the related control data signal instances including the MBSFNAreaConfiguration message 408 and 412 for decoding (e.g., where an attempted decoding of MBSFNAreaConfiguration message 408 or the related control data signal instance is unsuccessful). In another example, a receiver can attempt to combine control data signal instances comprising MBSFNAreaConfiguration messages in different MCCH repetition periods of the same modification period, such as MBSFNAreaConfiguration message 408 and MBSFNAreaConfiguration message 410 in MCCH modification period 402. For example, the receiver can attempt to combine the messages 408 and 410 after an attempt to decode MBSFNAreaConfiguration message 408 or the related control data signal instance is unsuccessful.

In another example, MBSFNAreaConfiguration message 408 can be a portion of a complete MBSFNAreaConfiguration message, and MBSFNAreaConfiguration message 412 can be at least another portion of the complete message. For example, MBSFNAreaConfiguration message 408 can be one of multiple MAC SDUs that include the complete MBSFNAreaConfiguration message or a related control data signal instance. In this example, as described, the receiver of the messages can decode the partial MBSFNAreaConfiguration messages (e.g., the SDUs) and accumulate the partial messages to generate the complete MBSFNAreaConfiguration message. For example, this allows the broadcast station to encode the portions of the MBSFNAreaConfiguration message with an MCS that uses at a lower data rate and/or provides more reliability.

Figure 5:
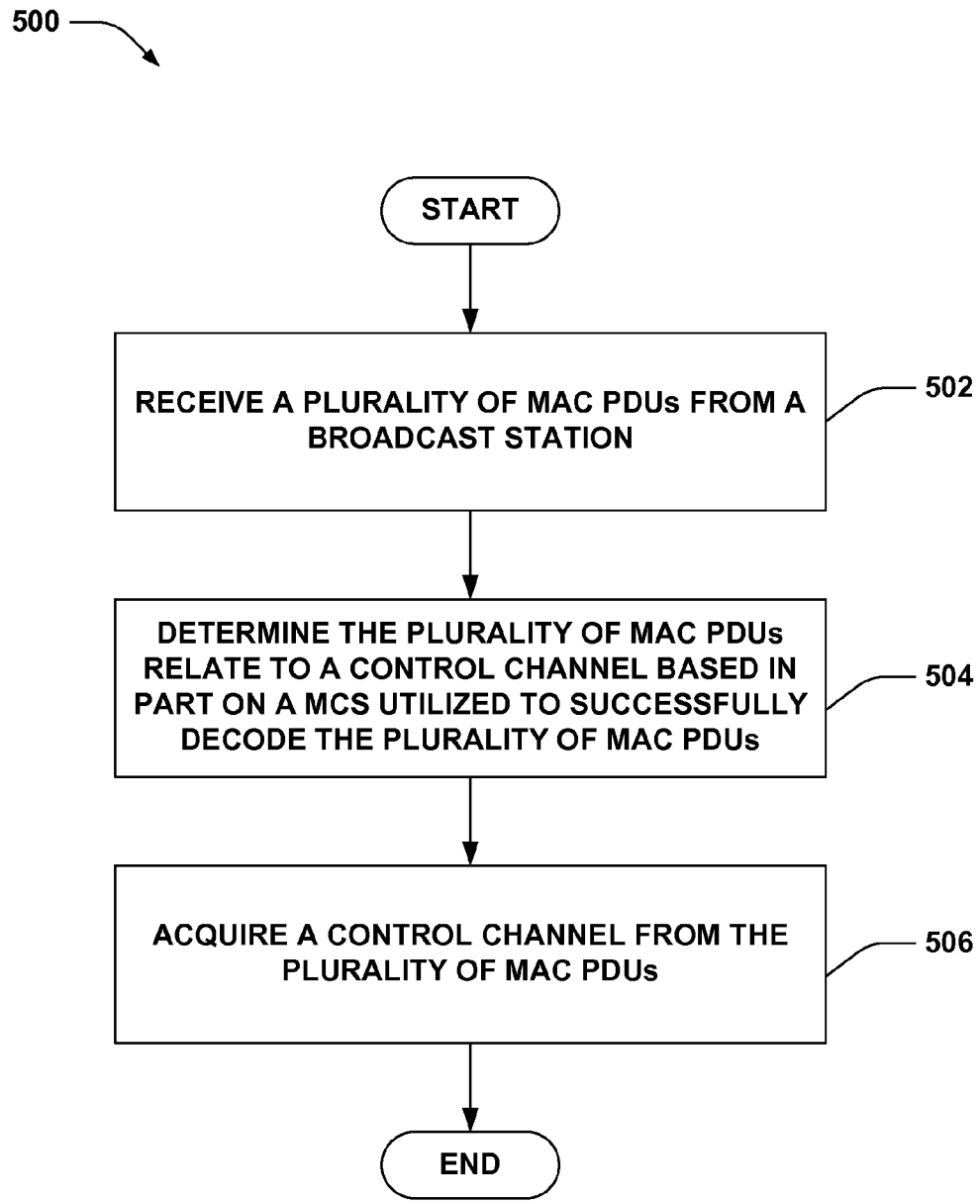
FIG. 5 is a flow chart of an aspect of a methodology for decoding multicast broadcast control data.
Figure 6:
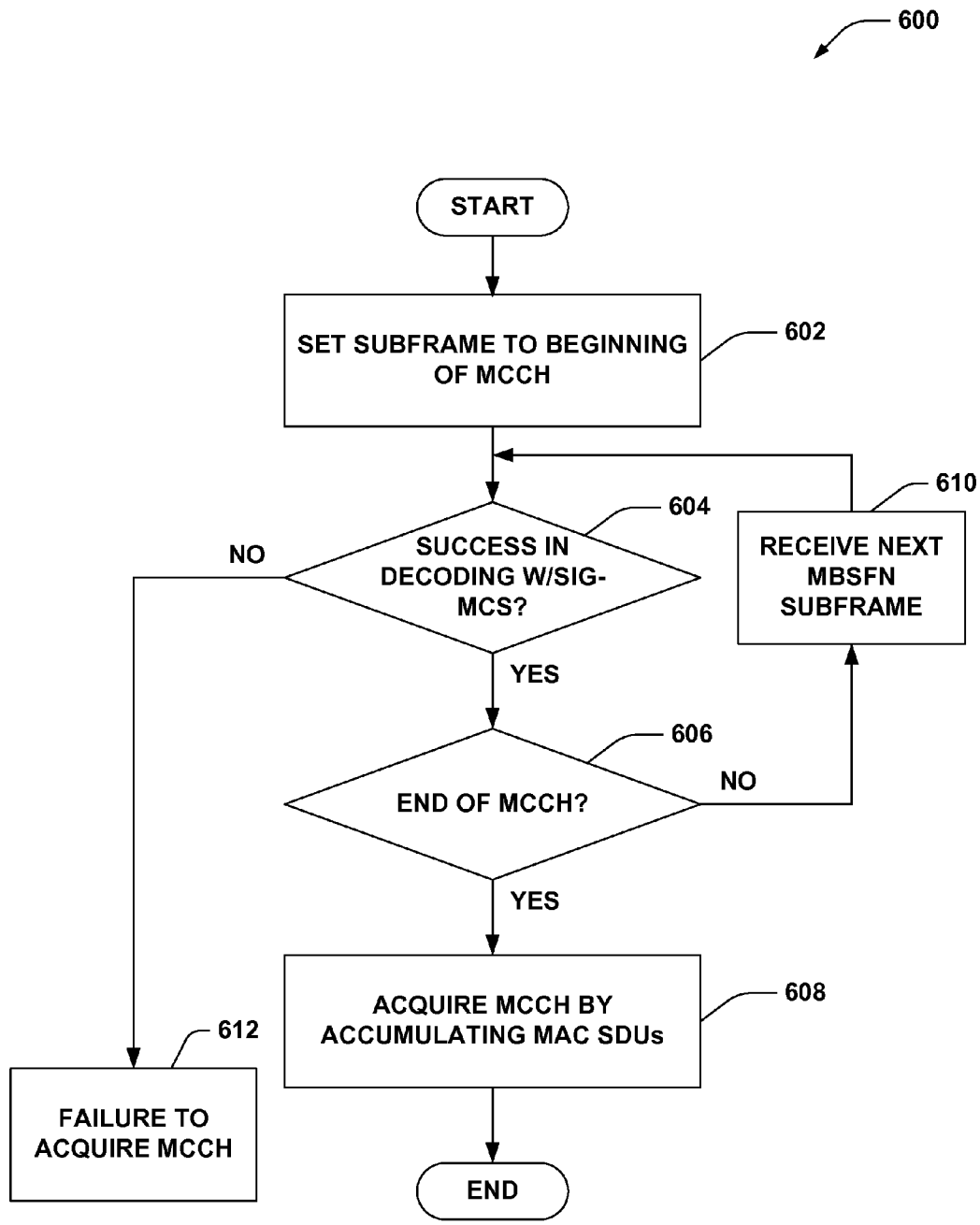
FIG. 6 is a flow chart of an aspect of a methodology for accumulating media access control service data units to acquire a control channel.
Figure 7:
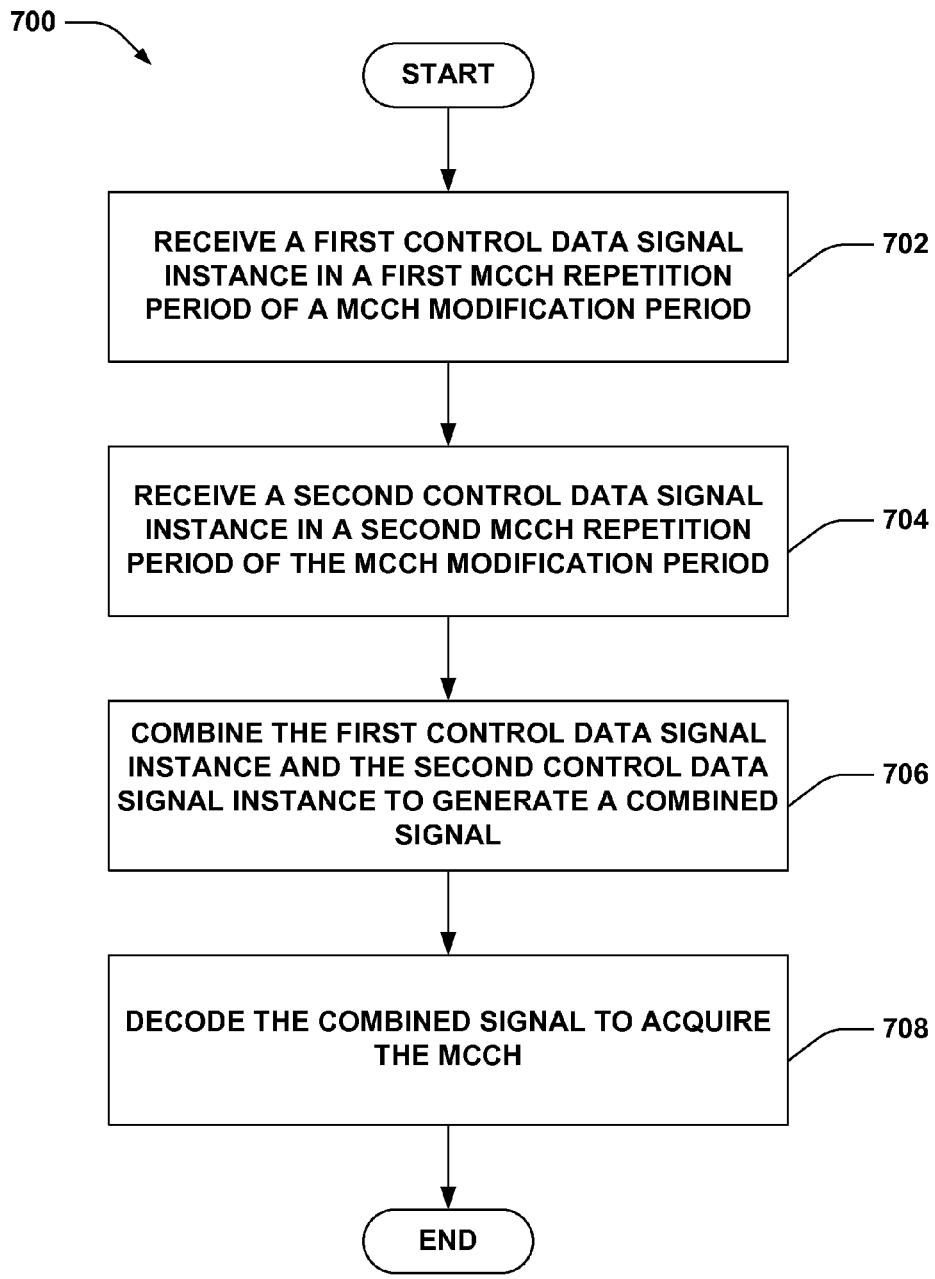
FIG. 7 is a flow chart of an aspect of a methodology for combining control data signal instances to decode a control channel.

FIGS. 5-7 illustrate example methodologies relating to decoding multicast broadcast control communications. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 5 depicts an example methodology 500 for acquiring a multicast broadcast control channel. At 502, a plurality of MAC PDUs can be received from a broadcast station. It is to be appreciated that the MAC PDUs can be received from additional broadcast stations in a MBSFN, in one example as described. For example, the MAC PDUs can be received in one or more broadcast signals, such as eMBMS signals received over MBSFN resources. The plurality of MAC PDUs can be encoded with one or more MCSs.

At 504, the plurality of MAC PDUs can be determined to relate to a control channel based on a MCS utilized to successfully decode the plurality of MAC PDUs. For example, the broadcast station can use a specific MCS, such as signaling-MCS, to encode the control channel, while using a different MCS to encode other channels, such as MTCHs. Thus, successfully decoding the MAC PDUs using the MCS can indicate the MAC PDUs correspond to the control channel.

At 506, the control channel can be acquired from the plurality of MAC PDUs. The broadcast station can have segmented the control channel into multiple MAC PDUs, and encoded the MAC PDUs using the MCS for the control channel. For example, a last MAC PDU of the control channel can be determined based on framing information, failed decoding using the MCS, etc., and the PDUs identified up to the last PDU can be accumulated to acquire the control channel.

FIG. 6 depicts an example methodology 600 for decoding multicast broadcast control communications. At 602, a subframe can be set to a beginning of an MCCH. For example, this can include setting a receiving window at a receiver to the beginning of the MCCH. At 604, it can be determined whether the subframe is successfully decoded using signaling-MCS. Signaling-MCS can be an MCS defined by a wireless network for decoding control channel communications, while other MCSs can be defined for decoding data and/or other channels. If the subframe is successfully decoded using signaling-MCS, this can indicate the channel is MCCH, and it can be determined whether the end of the MCCH has been reached at 606. For example, this can include determining whether the subframe includes the end of the MCCH based on at least one of framing information in a MAC PDU, unsuccessful decoding using the signaling-MCS, etc. If the end of the MCCH has been reached, at 608, the MCCH can be acquired by accumulating the MAC SDUs in the MAC PDUs received in the subframes. When the end of the MCCH is not reached, at 610, a next MBSFN subframe can be received, and the decoding process can continue at 604. When the subframe is not successfully decoded with signaling-MCS, at 612, a failure can be determined in acquiring the MCCH.

FIG. 7 shows an example methodology 700 for decoding a MCCH from multiple instances. At 702, a first control data signal instance can be received in a first MCCH repetition period of a MCCH modification period, and at 704, a second control data signal instance can be received in a second MCCH repetition period of the MCCH modification period. For example, the control data signal instances can be received from one or more broadcast stations in the plurality of MCCH repetition periods. At 706, the first control data signal instance and the second control data signal instance can be combined to generate a combined signal. For example, the first control data signal instance can be determined for combining with the second control data signal instance after an unsuccessful decoding attempt of the second control data signal instance to acquire an MCCH. At 708, the combined signal can be decoded to acquire the MCCH. Thus, in some examples, the control data signal instances can be the same in different MCCH repetition periods, and thus combination of the instances can be attempted where an instance is not properly received. In addition, the foregoing can be utilized to obtain specific messages in the MCCH, such as a MBSFNAreaConfiguration message. In one example, a third control data signal instance can be received, as described, and combined with the first and second control data signal instances to acquire the MCCH.

It will be appreciated that, in accordance with one or more aspects described herein, inferences can be made regarding determining an end of a MCCH, determining whether to receive a subsequent control data signal instance for acquiring an MCCH, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
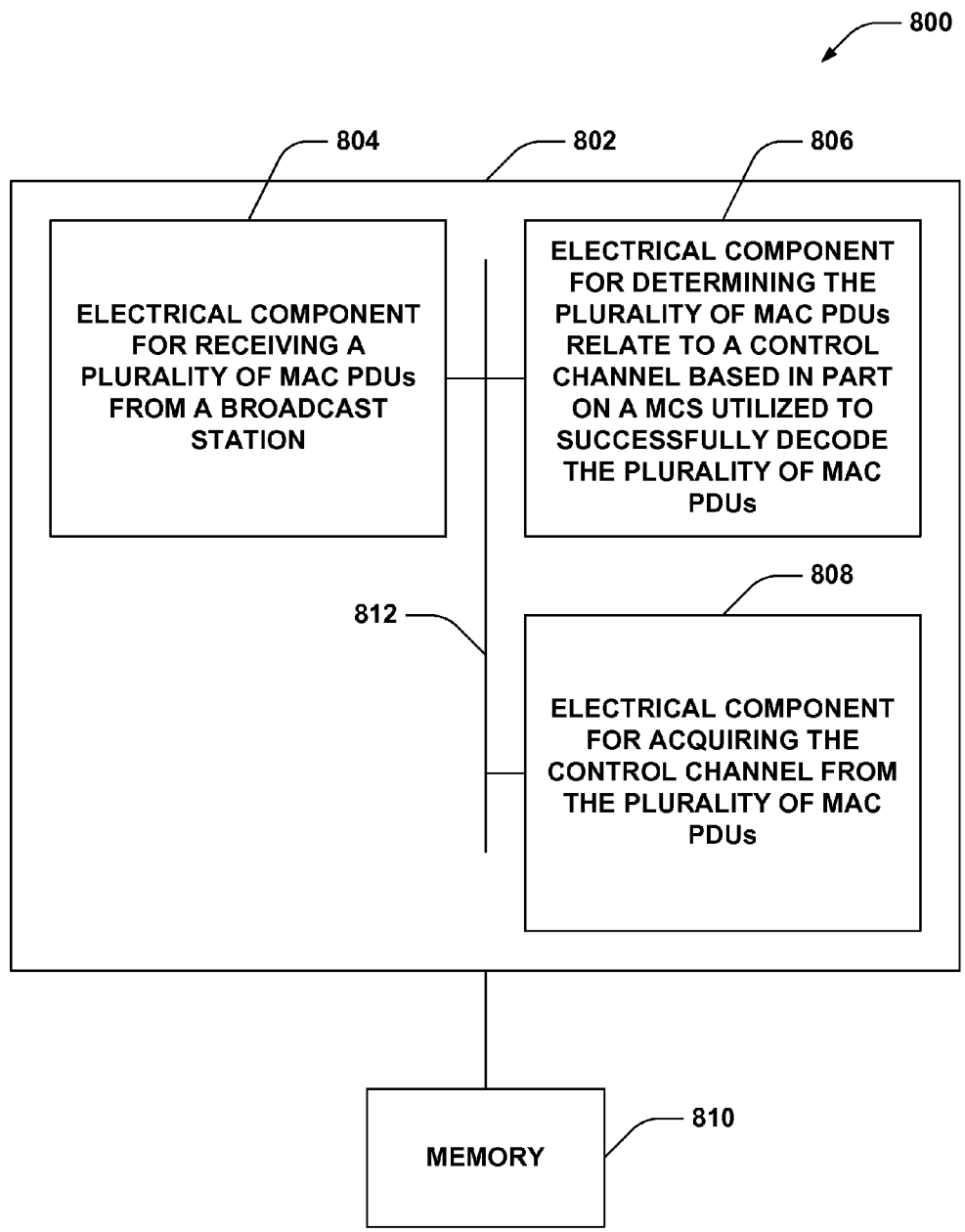
FIG. 8 is a block diagram of an example system that decodes multicast broadcast control data.

FIG. 8 illustrates a system 800 for decoding multicast broadcast control communications. For example, system 800 can reside at least partially within a device or other receiver. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a plurality of MAC PDUs from a broadcast station 804. Logical grouping 802 can also include an electrical component for determining the plurality of MAC PDUs relate to a control channel based in part on a MCS utilized to successfully decode the plurality of MAC PDUs 806.

For example, electrical component 806 can attempt to decode the plurality of MAC PDUs using a signaling-MCS or other MCS related to control channels. Logical grouping 802 can also include an electrical component for acquiring the control channel from the plurality of MAC PDUs 808. As described, electrical component 806 or another component can determine a last MAC PDU related to the control channel, and the MAC PDUs can be accumulated to acquire the control channel by electrical component 808. For example, electrical component 804 can include a receiving component 302, and electrical component 806 can include a MCS decoding component 310, as described above. In addition, for example, electrical component 808, in an aspect, can include a control channel acquiring component 304, as described above.

Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810. Electrical components 804, 806, and 808, in an example, can be interconnected over a bus 812 or similar connection to allow communication among the components. In one example, electrical components 804, 806, and 808 can include at least one processor, or each electrical component 804, 806, and 808 can be a corresponding module of at least one processor. Moreover, in an additional or alternative example, electrical components 804, 806, and 808 can be a computer program product comprising a computer readable medium, where each electrical component 804, 806, and 808 can be corresponding code.

Figure 9:
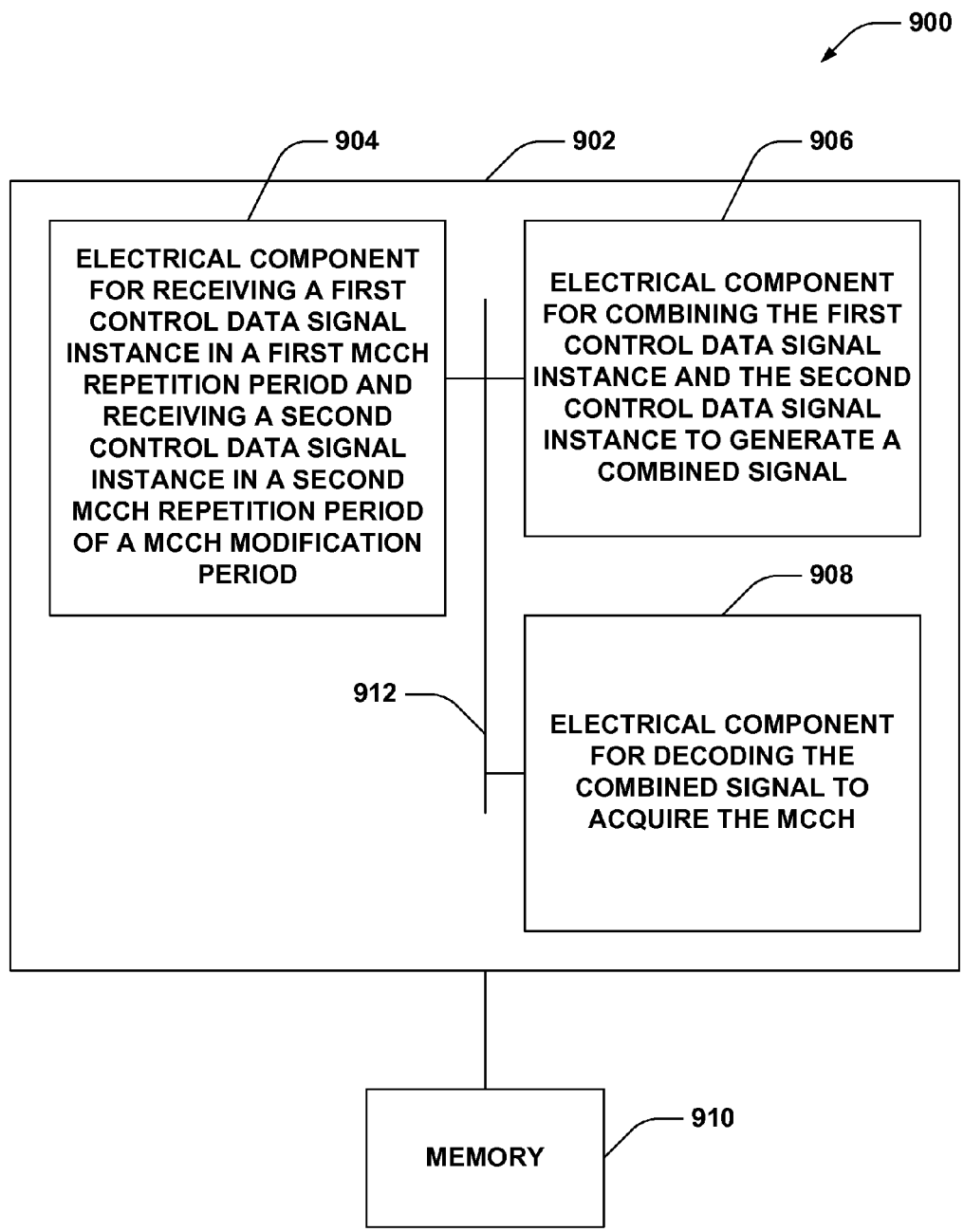
FIG. 9 is a block diagram of an example system that combines control data signal instances to decode a control channel.

FIG. 9 illustrates a system 900 for decoding multicast broadcast control communications. For example, system 900 can reside at least partially within a device or other receiver. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a first control data signal instance in a first MCCH repetition period and receiving a second control data signal instance in a second MCCH repetition period of an MCCH modification period 904. In one example, the electrical component 904 can receive the control data signal instances from a broadcast station. Logical grouping 902 can also include an electrical component for combining the first control data signal instance and the second control data signal instance to generate a combined signal 906.

In an example, electrical component 906 can combine the control data signal instances based in part on an unsuccessful decoding attempt of the second control data signal instance. Logical grouping 902 can also include an electrical component for decoding the combined signal to acquire the MCCH 908. As described, where the MCCH is the same in different repetition periods, the electrical component 908 can successfully decode the MCCH from the combined signal. For example, electrical component 904 can include a receiving component 302, and electrical component 906 can include a channel instance combining component 308, as described above. In addition, for example, electrical component 908, in an aspect, can include a control channel acquiring component 304.

Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910. Electrical components 904, 906, and 908, in an example, can be interconnected over a bus 912 or similar connection to allow communication among the components. In one example, electrical components 904, 906, and 908 can include at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
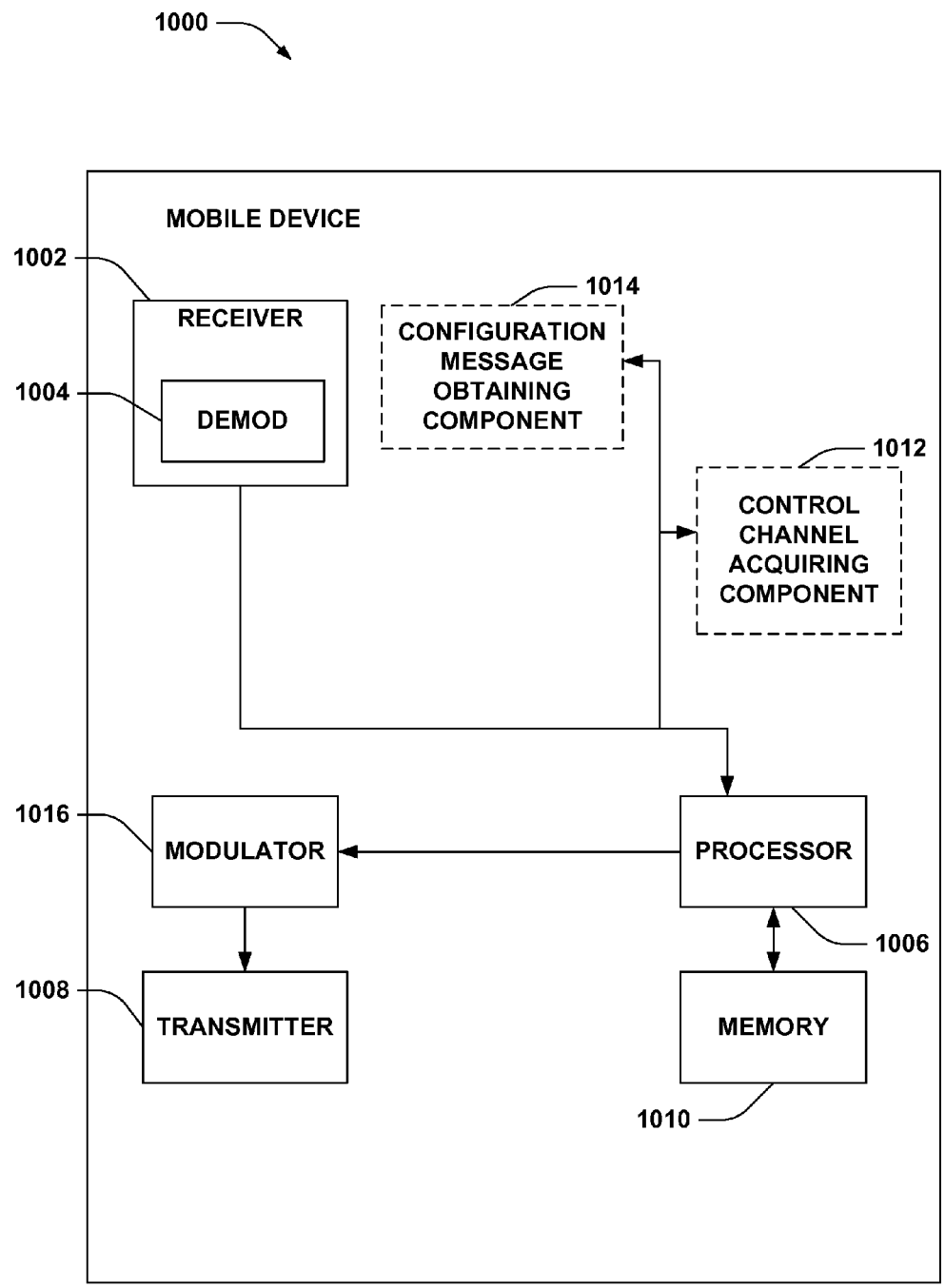
FIG. 10 is a block diagram of an aspect of an example mobile device in accordance with aspects described herein.

FIG. 10 is an illustration of a mobile device 1000 that facilitates decoding multicast broadcast control communications. Mobile device 1000 may include a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can include a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000.

Mobile device 1000 can additionally include memory 1010 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1010 can additionally store protocols and/or algorithms associated with estimating and/or utilizing a channel (e.g., performance based, capacity based, etc.).

It will be appreciated that the data store (e.g., memory 1010) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to include, without being limited to, these and any other suitable types of memory.

In one example, receiver 1002 can be similar to a receiving component 302. Processor 1006 can further be optionally operatively coupled to a control channel acquiring component 1012, which can be similar to a control channel acquiring component 304 and include components thereof described above, and/or a configuration message obtaining component 1014, which can be similar to configuration message obtaining component 306.

Mobile device 1000 still further includes a modulator 1016 that modulates signals for transmission by transmitter 1008 to, for instance, a base station, another mobile device, etc. Moreover, for example, mobile device 1000 can include multiple transmitters 1008 for multiple network interfaces, as described. Although depicted as being separate from the processor 1006, it is to be appreciated that the control channel acquiring component 1012, configuration message obtaining component 1014, demodulator 1004, and/or modulator 1016 can be part of the processor 1006 or multiple processors (not shown)), and/or stored as instructions in memory 1010 for execution by processor 1006.

Figure 11:
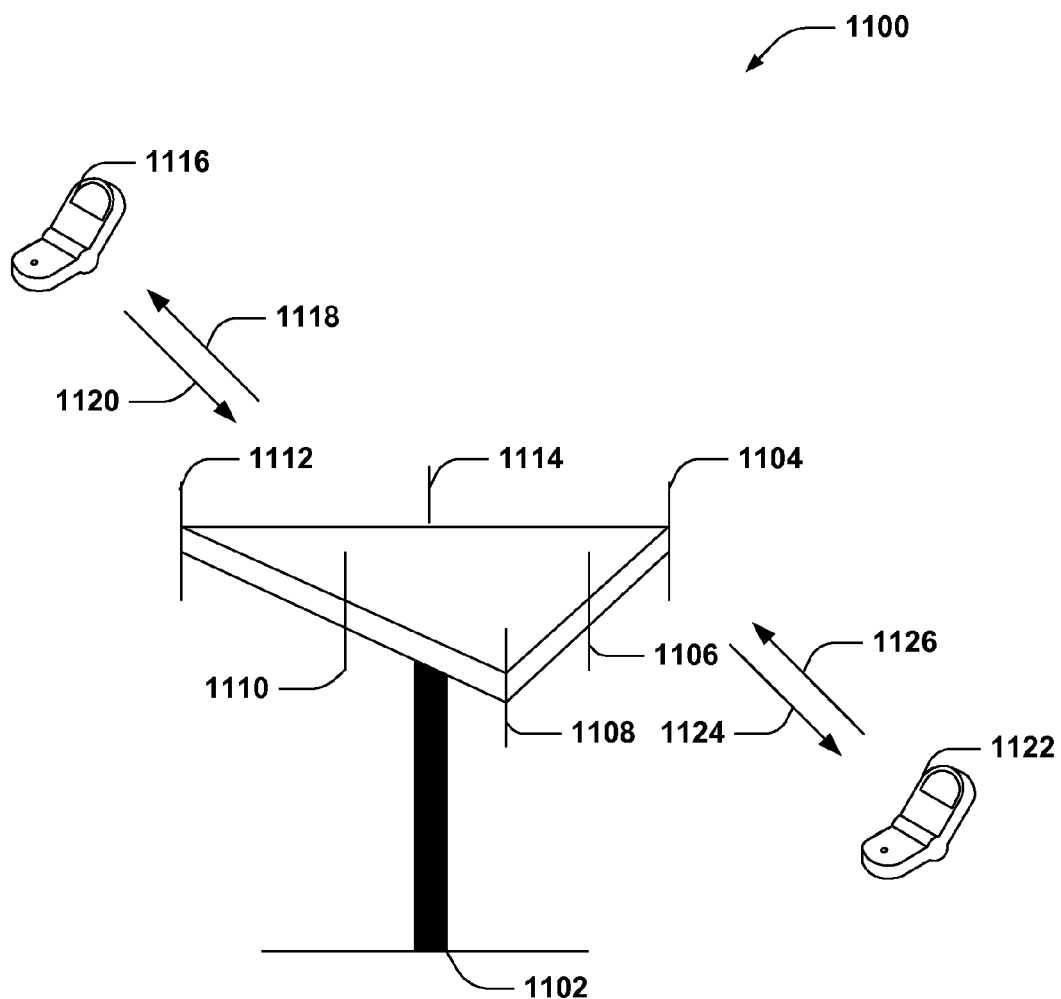
FIG. 11 is a block diagram of an aspect of a wireless communication system in accordance with various aspects set forth herein.

FIG. 11 illustrates a wireless communication system 1100 in accordance with various embodiments presented herein.

System 1100 includes a base station 1102 that can include multiple antenna groups. For example, one antenna group can include antennas 1104 and 1106, another group can include antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn include a plurality of components or modules associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system or similar system that allows assigning multiple carriers between base station 1102 and mobile devices 1116 and/or 1122. For example, base station 1102 can be a broadcast station that communicates multicast broadcast data to mobile devices 1116 and/or 1122, and the mobile devices 1116 and/or 1122 can decode the data and related control data, as described herein.

Figure 12:
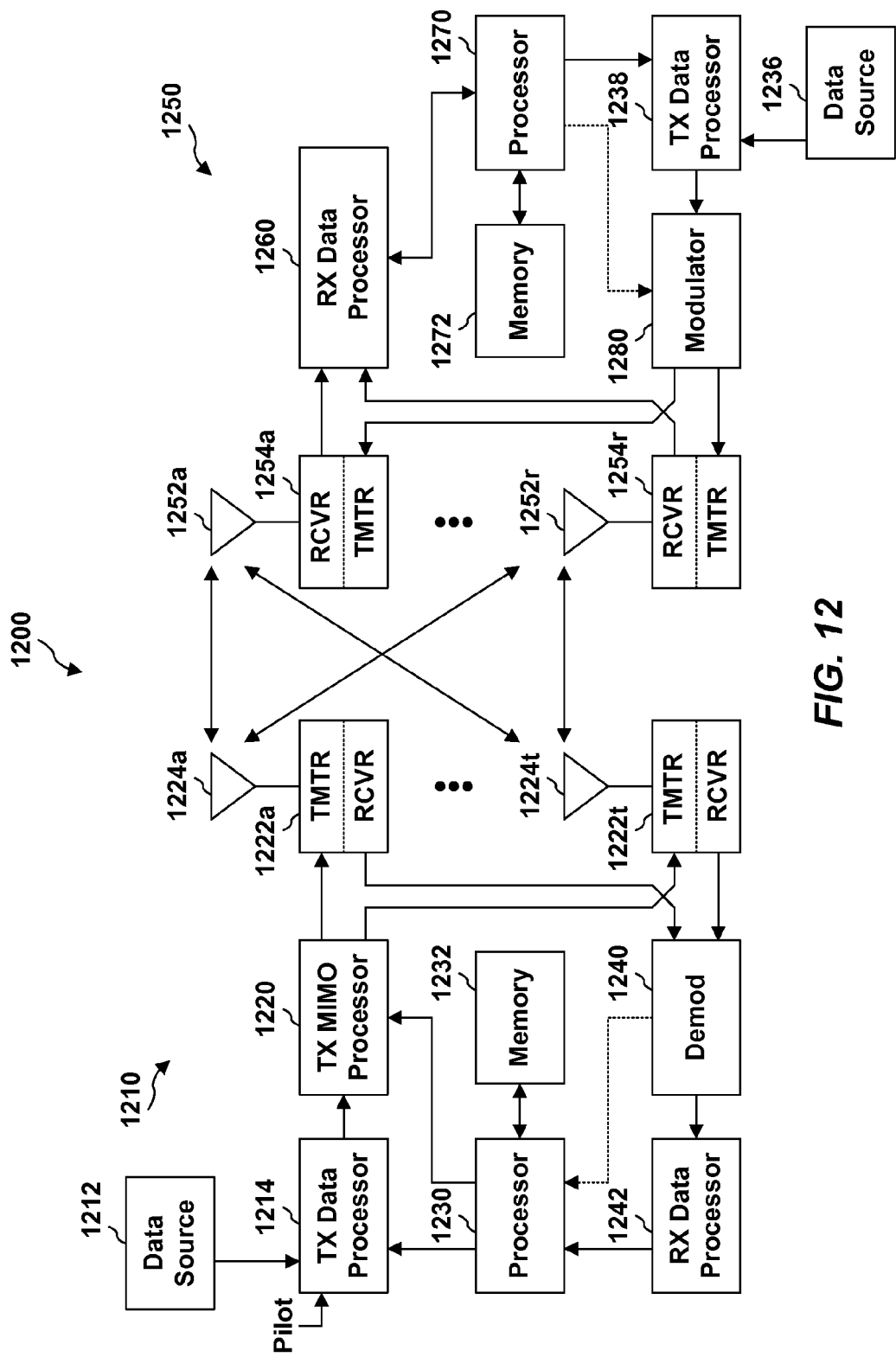
FIG. 12 is a schematic block diagram of an aspect of a wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the frame configurations (FIG. 1), PDUs (FIG. 2), systems (FIGS. 3, 8, 9, and 11), communication timelines (FIG. 4), methods (FIGS. 5-7), and/or mobile devices (FIG. 10) described herein to facilitate wireless communication there between. For example, components or functions of the systems and/or methods described herein can be part of a memory 1232 and/or 1272 or processors 1230 and/or 1270 described below, and/or can be executed by processors 1230 and/or 1270 to perform the disclosed functions.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

The reverse link message can include various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Moreover, processors 1230 and 1270 can assist in decoding multicast broadcast control data, as described herein. For example, processors 1230 and 1270 can execute functions described with respect to such decoding and/or memory 1232 and 1272 can store such functions and/or data related thereto.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for decoding multicast broadcast control data in a wireless network, comprising:
   receiving a plurality of media access control (MAC) protocol data units (PDU) from a broadcast station;
   determining the plurality of MAC PDUs relate to a control channel based in part on a modulation and coding scheme (MCS) utilized to successfully decode the plurality of MAC PDUs; and
   acquiring the control channel from the plurality of MAC PDUs.

2. The method of claim 1, further comprising determining a last MAC MU of the plurality of MAC PDUs comprising a portion of the control channel based in part on framing information in a corresponding MAC service data unit; and
   wherein the acquiring of the control channel comprises combining the plurality of MAC PDUs based on the last MAC PDU.

3. The method of claim 2, further comprising determining a first MAC PDU of the plurality of MAC PDUs comprising the control channel based in part on the framing information.

4. The method of claim 1, farther comprising determining a last MAC PDU of the plurality of MAC PDUs comprising a portion of the control channel based in part on an unsuccessful decoding of a subsequent MAC PDU using the MCS; and
   wherein the acquiring of the control channel comprises combining the plurality of MAC PDUs based on the last MAC PDU.

5. The method of claim 1, wherein the receiving comprises setting a receiving window to a subframe at a beginning of the control channel.

6. The method of claim 1, wherein the control channel is a multicast control channel in an evolved multimedia broadcast multicast service.

7. An apparatus for decoding multicast broadcast control data in a wireless network, comprising:
- means for receiving a plurality of media access control (MAC) protocol data units (PDU) from a broadcast station;
- means for determining the plurality of MAC PDUs relate to a control channel based in part on a modulation and coding scheme (MCS) utilized to successfully decode the plurality of MAC PDUs; and
- means for acquiring the control channel from the plurality of MAC PDUs.

8. The apparatus of claim 7, further comprising means for determining a last MAC PDU in the plurality of MAC PDUs comprising a portion of the control channel based in part on framing information in a corresponding MAC service data unit; and
- wherein the means for acquiring the control channel comprises means for combining the plurality of MAC PDUs based on the last MAC PDU.

9. The apparatus of claim 7, further comprising means for determining a last MAC PDU in the plurality of MAC PDUs comprising a portion of the control channel based in part on an unsuccessful decoding of a subsequent MAC PDU using the MCS; and
- wherein the means for acquiring the control channel comprises means for combining the plurality of MAC PDUs based on the last MAC PDU.

10. An apparatus for wireless communication, comprising:
- at least one processor configured to:
  - receive a plurality of media access control (MAC) protocol data units (PDU) from a broadcast station;
  - determine the plurality of MAC PDUs relate to a control channel based in part on a modulation and coding scheme (MCS) utilized to successfully decode the plurality of MAC PDUs; and
  - acquire the control channel from the plurality of MAC PDUs; and a memory coupled to the at least one processor.

11. The apparatus of claim 10, wherein the at least one processor is further configured to determine a last MAC PDU in the plurality of MAC PDUs comprising a portion of the control channel based in part on framing information in a corresponding MAC service data unit; and
- wherein the at least one processor configured to acquire the control channel is configured to combine the plurality of MAC PDUs based on the last MAC PDU.

12. The apparatus of claim 10, wherein the at least one processor is further configured to determine a last MAC PDU in the plurality of MAC PDUs comprising a portion of the control channel based in part on an unsuccessful decoding of a subsequent MAC PDU using the MCS; and
- wherein the at least one processor configured to acquire the control channel is configured to combine the plurality of MAC PDUs based on the last MAC PDU.

13. A computer program product for decoding multicast broadcast control data in a wireless network, comprising:
- a non-transitory computer-readable medium, comprising:
  - code for causing at least one computer to receive a plurality of media access control (MAC) protocol data units (PDU) from a broadcast station;
  - code for causing the at least one computer to determine the plurality of MAC PDUs relate to a control channel based in part on a modulation and coding scheme (MCS) utilized to successfully decode the plurality of MAC PDUs; and
  - code for causing the at least one computer to acquire the control channel from the plurality of MAC PDUs.

14. The computer program product of claim 13, wherein the non-transitory computer-readable medium further comprises code for causing the at least one computer to determine a last MAC PDU in the plurality of MAC PDUs comprising a portion of the control channel based in part on framing information in a corresponding MAC service data unit; and
- wherein the code for causing the at least one computer to acquire the control channel comprises code for causing the at least one computer to combine the plurality of MAC PDUs based on the last MAC PDU.

15. The computer program product of claim 13, wherein the non-transitory computer-readable medium further comprises code for causing the at least one computer to determine a last MAC PDU in the plurality of MAC PDUs comprising a portion of the control channel based in part on an unsuccessful decoding of a subsequent MAC PDU using the MCS; and
- wherein the code for causing the at least one computer to acquire the control channel comprises code for causing the at least one computer to combine the plurality of MAC PDUs based on the last MAC PDU.

16. An apparatus for decoding multicast broadcast control data in a wireless network, comprising:
- a receiving component for receiving a plurality of media access control (MAC) protocol data units (PDU) from a broadcast station;
- a modulation and coding scheme (MCS) decoding component for determining the plurality of MAC PDUs relate to a control channel based in part on a MCS utilized to successfully decode the plurality of MAC PDUs; and
- a control channel acquiring component for acquiring the control channel from the plurality of MAC PDUs.

17. The apparatus of claim 16, further comprising a framing information analyzing component for determining a last MAC PDU in the plurality of MAC PDUs comprising a portion the control channel based in part on framing information in a corresponding MAC service data unit; and
- wherein the control channel acquiring component for acquiring the control channel combines the plurality of MAC PDUs based on the last MAC PDU.

18. The apparatus of claim 17, wherein the framing information analyzing component determines a first MAC PDU of the plurality of MAC PDUs comprising the control Channel based in part on the framing information.

19. The apparatus of claim 16, wherein the MCS decoding component determines a last MAC PDU in the plurality of MAC PDUs comprising a portion of the control channel an unsuccessful decoding of a subsequent MAC PDU using the MCS; and
- wherein the control channel acquiring component for acquiring the control channel combines the plurality of MAC PDUs based on the last MAC PDU.

20. The apparatus of claim 16, wherein the receiving component sets a receiving window to a subframe at a beginning of the control channel.

21. The apparatus of claim 16, wherein the control channel is a multicast control channel in an evolved multimedia broadcast multicast service.

* * * * *